United States Patent
Lee et al.

(10) Patent No.: US 10,798,726 B2
(45) Date of Patent: Oct. 6, 2020

(54) METHOD AND APPARATUS FOR TRANSMITTING SPS ASSISTANCE INFORMATION IN WIRELESS COMMUNICATION SYSTEM

(71) Applicant: LG ELECTRONICS INC., Seoul (KR)

(72) Inventors: Youngdae Lee, Seoul (KR); Sunyoung Lee, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 201 days.

(21) Appl. No.: 15/694,610

(22) Filed: Sep. 1, 2017

(65) Prior Publication Data
US 2018/0049225 A1   Feb. 15, 2018

Related U.S. Application Data

(63) Continuation of application No. PCT/KR2017/008481, filed on Aug. 7, 2017.
(Continued)

(30) Foreign Application Priority Data

Jul. 27, 2017   (KR) .................. 10-2017-0095329

(51) Int. Cl.
*H04W 72/12*   (2009.01)
*H04W 36/00*   (2009.01)
(Continued)

(52) U.S. Cl.
CPC ... *H04W 72/1263* (2013.01); *H04W 36/0055* (2013.01); *H04W 72/0426* (2013.01);
(Continued)

(58) Field of Classification Search
CPC ......... H04W 72/0426; H04W 72/0413; H04W 36/0005; H04W 36/0007; H04W 36/0009; H04W 36/0016
See application file for complete search history.

(56) References Cited

U.S. PATENT DOCUMENTS

2010/0150109 A1* 6/2010 Bradley et al. ....... H04W 36/34
370/331
2014/0018085 A1* 1/2014 Young ............... H04W 52/0235
455/450

(Continued)

FOREIGN PATENT DOCUMENTS

EP    2882226       6/2015
WO    2017148236    9/2017

OTHER PUBLICATIONS

PCT International Application No. PCT/KR2017/008481, International Search Report dated Nov. 8, 2017, 3 pages.
(Continued)

*Primary Examiner* — Hoon J Chung
(74) *Attorney, Agent, or Firm* — Lee Hong Degerman Kang Waimey

(57) ABSTRACT

Provided is a method and an apparatus for transmitting user equipment (UE) assistance information for a semi-persistent scheduling (SPS) to a target evolved NodeB (eNB) in a wireless communication system. A source eNB in a handover, receives the UE assistance information for the SPS from a UE, and transmits the UE assistance information for the SPS to the target eNB. The UE assistance information for the SPS may include a SPS period and a time offset.

12 Claims, 7 Drawing Sheets

Related U.S. Application Data

(60) Provisional application No. 62/374,009, filed on Aug. 12, 2016.

(51) Int. Cl.
   *H04W 72/04* (2009.01)
   *H04L 5/00* (2006.01)
   *H04W 92/02* (2009.01)

(52) U.S. Cl.
   CPC ....... *H04L 5/0091* (2013.01); *H04W 72/0413* (2013.01); *H04W 92/02* (2013.01)

(56) References Cited

U.S. PATENT DOCUMENTS

| | | | |
|---|---|---|---|
| 2014/0274062 A1* | 9/2014 | Centonza et al. | H04W 36/008 455/437 |
| 2015/0223212 A1* | 8/2015 | Der Velde | H04L 5/0032 370/329 |
| 2015/0257144 A1 | 9/2015 | Hooli et al. | |
| 2017/0019887 A1* | 1/2017 | Jiang | H04W 72/042 |
| 2019/0313375 A1* | 10/2019 | Loehr | H04W 72/04 |

OTHER PUBLICATIONS

QUALCOMM, "SPS for V2V Communication", 3GPP TSG RAN WG2 Meeting #94, R2-164063, May 2016, 6 pages.
ZTE, "SPS enhancements for V2V over PC5", 3GPP TSG RAN WG2 Meeting #94, R2-163836, May 2016, 5 pages.
Potevio, "UE assisted information for SPS", 3GPP TSG RAN WG2 Meeting #94, R2-163885, May 2016, 4 pages.
European Patent Office Application Serial No. 17839744.4, Search Report dated Jan. 7, 2020, 9 pages.
Japan Patent Office Application No. 2019-507124, Office Action dated Jan. 7, 2020, 3 pages.
LG Electronics Inc., "SL SPS configuration and UE assistant information", R2-165693, 3GPP TSG-RAN WG2 #95, Aug. 2016, 6 pages.
3rd Generation Partnership Project; Technical Specification Group Radio Access Network; Evolved Universal Terrestrial Radio Access (E-UTRA); Radio Resource Control (RRC); Protocol specification (Release 14), 3GPP TS 36.331 V14.3.0, Jun. 2017.
Korean Intellectual Property Office Application No. 10-2019-7003379, Notice of Allowance dated Jul. 6, 2020, 3 pages.

* cited by examiner

METHOD AND APPARATUS FOR TRANSMITTING SPS ASSISTANCE INFORMATION IN WIRELESS COMMUNICATION SYSTEM

CROSS-REFERENCE TO RELATED APPLICATIONS

This application is a continuation of International Application PCT/KR2017/008481, with an international filing date of Aug. 7, 2017, now expired, which claims the benefit of earlier filing date and right of priority to Korean Patent Application No. 10-2017-0095329 filed in the Korean Intellectual Property Office on Jul. 27, 2017 and also claims the benefit of U.S. Provisional Patent Application No. 62/374,009, filed on Aug. 12, 2016, the contents of which are hereby incorporated by reference herein in its entirety.

BACKGROUND OF THE INVENTION

Field of the Invention

The present invention relates to a wireless communication, more specifically, to a method and an apparatus for transmitting semi-persistent scheduling (SPS) assistance information in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

LTE-based vehicle-to-everything (V2X) is urgently desired from market requirement as widely deployed LTE-based network provides the opportunity for the vehicle industry to realize the concept of 'connected cars'. The market for vehicle-to-vehicle (V2V) communication in particular is time sensitive because related activities such as research projects, field test, and regulatory work are already ongoing or expected to start in some countries or regions such as US, Europe, Japan, Korea, and China.

Semi-persistent scheduling (SPS) is a feature that greatly reduces control channel overhead for applications that require continuous radio resource allocation, such as voice over Internet protocol (VoIP). Without the SPS, all downlink (DL) or uplink (UL) physical resource block (PRB) allocations must be granted through access grant messages on the physical downlink control channel (PDCCH). This is usually sufficient for most bursty best effort type applications with large packet sizes, and thus usually only a small number of users are scheduled in each subframe. However, for applications requiring continuous allocation of small packets (e.g. VoIP), the access grant overhead of the control channel can be significantly reduced to the SPS. That is, the SPS introduces a persistent PRB allocation that the user can expect from the DL or transmit in the UL. There are various ways in which SPS can establish the persistent allocation.

As V2X communication is characterized by its size being relatively small and periodically transmitted, a method of transmitting the V2X messages through resources allocated by the SPS is under discussion. Also, in order to facilitate resource allocation by the SPS, a method of transmitting assistance information related to the SPS between a user equipment (UE) and a network and/or between a plurality of network nodes is also under discussion.

SUMMARY OF THE INVENTION

The present invention provides a method and an apparatus for transmitting semi-persistent scheduling (SPS) assistance information in a wireless communication system. The present invention provides a method for receiving assistance information for the SPS from a user equipment (UE), and transmitting it to a target eNB in handover.

In an aspect, a method for transmitting user equipment (UE) assistance information for a semi-persistent scheduling (SPS) by a source evolved NodeB (eNB) to a target eNB in a wireless communication system is provided. The method includes receiving the UE assistance information for the SPS from a UE, and transmitting the UE assistance information for the SPS to the target eNB.

The UE assistance information for the SPS may include a SPS period and a time offset. The UE assistance information for the SPS may include at least one of UE assistance information for a sidelink (SL) SPS or UE assistance information for an uplink (UL) SPS. The UE assistance information for the SPS may be transmitted via an X2 interface to the target eNB. The UE assistance information for the SPS may be included in an AS-Context information element (IE) and may be transmitted to the target eNB via a handover preparation information message.

In another aspect, a source evolved NodeB (eNB) in a wireless communication system is provided. The source eNB includes a memory, and a processor, coupled to the memory, that receives UE assistance information for a semi-persistent scheduling (SPS) from a UE, and transmits the UE assistance information for the SPS to the target eNB.

DESCRIPTION OF EXEMPLARY EMBODIMENTS

Figure 1:
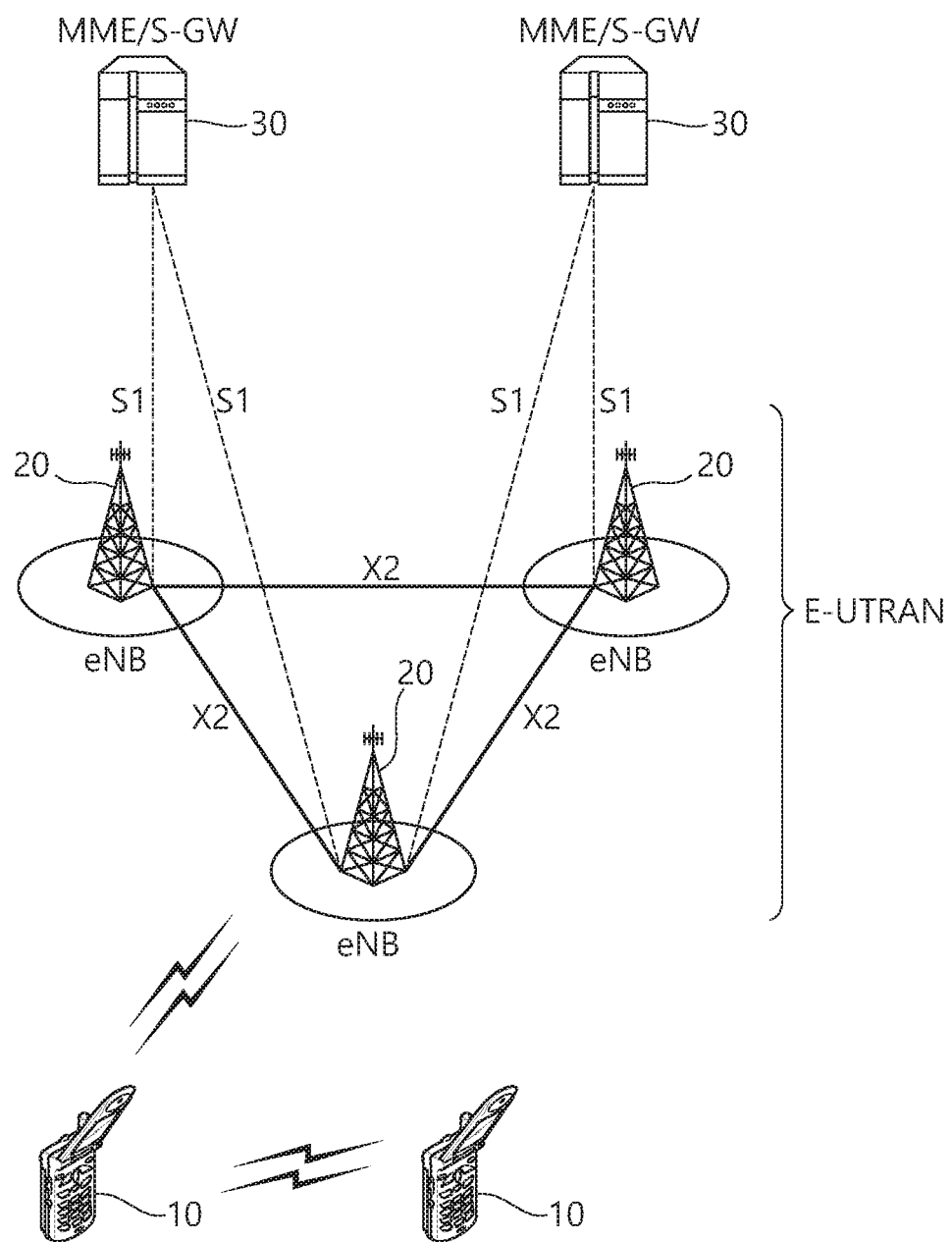
FIG. 1 shows 3GPP LTE system architecture

FIG. 1 shows 3GPP LTE system architecture. Referring to FIG. 1, the 3GPP LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10. An uplink (UL) denotes communication from the UE 10 to the eNB 20. A sidelink (SL) denotes communication between the UEs 10. In the DL, a transmitter may be a part of the eNB 20, and a receiver may be a part of the UE 10. In the UL, the transmitter may be a part of the UE 10, and the receiver may be a part of the eNB 20. In the SL, the transmitter and receiver may be a part of the UE 10.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The UEs 10 are connected to each other via a PC5 interface. The eNBs 20 are connected to each other via an X2 interface. Neighboring eNBs may have a meshed network structure that has the X2 interface. The eNB 20 is connected to the gateway 30 via an S1 interface.

Figure 2:
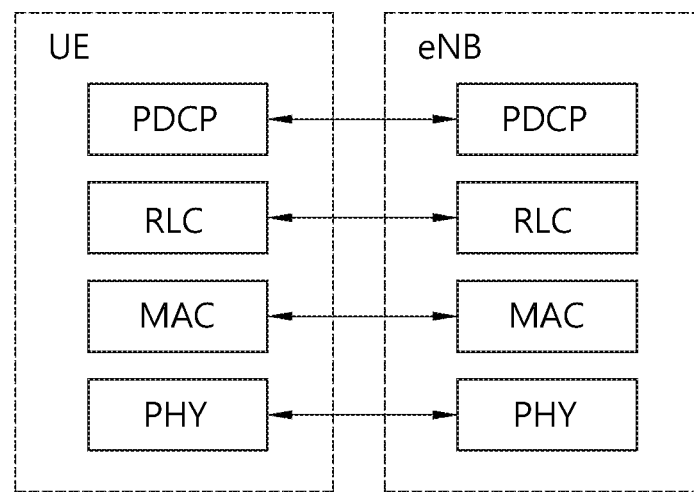
FIG. 2 shows a block diagram of a user plane protocol stack of an LTE system.
Figure 3:
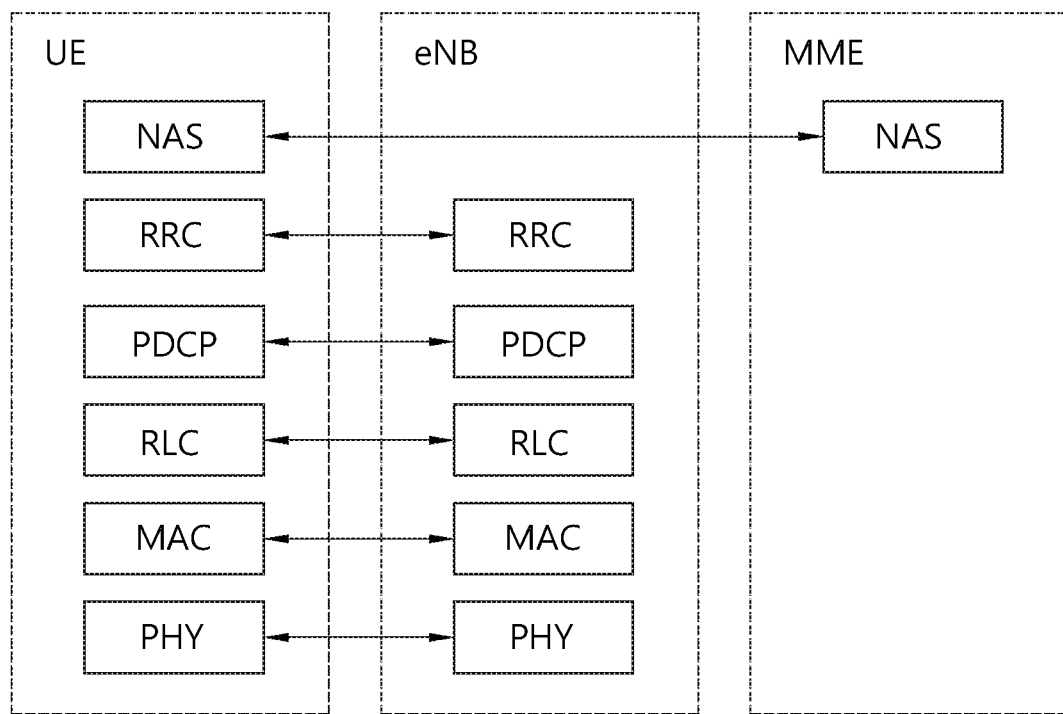
FIG. 3 shows a block diagram of a control plane protocol stack of an LTE system.

FIG. 2 shows a block diagram of a user plane protocol stack of an LTE system. FIG. 3 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel A physical channel is mapped to the transport channel. Data between the MAC layer and the PHY layer is transferred through the transport channel Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 2, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 3, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

A physical channel transfers signaling and data between PHY layer of the UE and eNB with a radio resource. A physical channel consists of a plurality of subframes in time domain and a plurality of subcarriers in frequency domain. One subframe, which is 1ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, and an uplink shared channel (UL-SCH) for transmitting user traffic or control signals. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both UL and DL. The MTCH is a point-to-multipoint downlink channel for transmitting traffic data from the network to the UE.

UL connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX period. Specifically, the UE monitors a paging signal at a specific paging occasion of every UE specific paging DRX period. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Sidelink is described. Sidelink is UE to UE interface for sidelink communication and sidelink discovery. The Sidelink corresponds to the PC5 interface. Sidelink communication is AS functionality enabling proximity-based services (ProSe) direct communication, between two or more nearby UEs, using E-UTRA technology but not traversing any network node. Sidelink discovery is AS functionality enabling ProSe direct discovery, using E-UTRA technology but not traversing any network node.

Sidelink physical channels include a physical sidelink broadcast channel (PSBCH) carrying system and synchronization related information, transmitted from the UE, a physical sidelink discovery channel (PSDCH) carrying sidelink discovery message from the UE, a physical sidelink control channel (PSCCH) carrying control from a UE for sidelink communication, and a physical sidelink shared channel (PSSCH) carrying data from a UE for sidelink communication. The PSBCH is mapped to a sidelink broadcast channel (SL-BCH). The PSDCH is mapped to a sidelink discovery channel (SL-DCH). The PSSCH is mapped to a sidelink shared channel (SL-SCH).

In sidelink, the logical channels are also classified into control channels for transferring control plane information and traffic channels for transferring user plane information. The sidelink control channel includes a sidelink broadcast control channel (SBCCH) which is a sidelink channel for broadcasting sidelink system information from one UE to other UE(s). The SBCCH is mapped to the SL-BCH. The sidelink traffic channel includes a sidelink traffic channel (STCH) which is a point-to-multipoint channel, for transfer of user information from one UE to other UEs. The STCH is mapped to the SL-SCH. This channel is used only by sidelink communication capable UEs.

Semi-persistent scheduling (SPS) is described. E-UTRAN can allocate semi-persistent DL resources for the first HARQ transmissions to UEs. RRC defines the periodicity of the semi-persistent DL grant. PDCCH indicates whether the DL grant is a semi-persistent one, i.e. whether it can be implicitly reused in the following TTIs according to the periodicity defined by RRC.

When required, retransmissions are explicitly signaled via the PDCCH(s). In the subframes where the UE has semi-persistent DL resource, if the UE cannot find its C-RNTI on the PDCCH(s), a downlink transmission according to the semi-persistent allocation that the UE has been assigned in the TTI is assumed. Otherwise, in the sub-frames where the UE has semi-persistent downlink resource, if the UE finds its cell radio network temporary identity (C-RNTI) on the PDCCH(s), the PDCCH allocation overrides the semi-persistent allocation for that TTI and the UE does not decode the semi-persistent resources.

When carrier aggregation (CA) is configured, semi-persistent DL resources can only be configured for the primary cell (PCell) and only PDCCH allocations for the PCell can override the semi-persistent allocation. When dual connectivity (DC) is configured, semi-persistent DL resources can only be configured for the PCell or primary secondary cell (PSCell). Only PDCCH allocations for the PCell can override the semi-persistent allocation for PCell and only PDCCH allocations for the PSCell can override the semi-persistent allocation for PSCell.

In addition, E-UTRAN can allocate a semi-persistent UL resource for the first HARQ transmissions and potentially retransmissions to UEs. RRC defines the periodicity of the semi-persistent UL grant. PDCCH indicates whether the UL grant is a semi-persistent one, i.e. whether it can be implicitly reused in the following TTIs according to the periodicity defined by RRC.

In the subframes where the UE has semi-persistent UL resource, if the UE cannot find its C-RNTI on the PDCCH(s), an UL transmission according to the semi-persistent allocation that the UE has been assigned in the TTI can be made. The network performs decoding of the pre-defined PRBs according to the pre-defined MCS. Otherwise, in the subframes where the UE has semi-persistent UL resource, if the UE finds its C-RNTI on the PDCCH(s), the PDCCH allocation overrides the persistent allocation for that TTI and the UE's transmission follows the PDCCH allocation, not the semi-persistent allocation. Retransmissions are either implicitly allocated in which case the UE uses the semi-persistent UL allocation, or explicitly allocated via PDCCH(s) in which case the UE does not follow the semi-persistent allocation.

Similarly as for the DL, semi-persistent UL resources can only be configured for the PCell and only PDCCH allocations for the PCell can override the semi-persistent allocation. When DC is configured, semi-persistent UL resources can only be configured for the PCell or PSCell. Only PDCCH allocations for the PCell can override the semi-persistent allocation for PCell and only PDCCH allocations for the PSCell can override the semi-persistent allocation for PSCell.

When SPS is enabled by RRC, the following information is provided.
  SPS C-RNTI;
  UL SPS interval semiPersistSchedIntervalUL and number of empty transmissions before implicit release implicitReleaseAfter, if SPS is enabled for the UL;
  Whether twoIntervalsConfig is enabled or disabled for UL, only for time division duplex (TDD);
  DL SPS interval semiPersistSchedIntervalDL and number of configured HARQ processes for SPS numberOfConfSPS-Processes, if SPS is enabled for the DL;

When SPS for UL or DL is disabled by RRC, the corresponding configured grant or configured assignment shall be discarded.

The above information may be transmitted from SPS-Config information element (IE). The SPS-Config IE is used to specify the SPS configuration. Table 1 shows the SPS-Config IE.

TABLE 1

```
-- ASN1START
SPS-Config ::= SEQUENCE {
    semiPersistSchedC-RNTI          C-RNTI              OPTIONAL, -- Need OR
    sps-ConfigDL                    SPS-ConfigDL        OPTIONAL, -- Need ON
    sps-ConfigUL                    SPS-ConfigUL        OPTIONAL  -- Need ON
}
SPS-ConfigDL ::= CHOICE{
    release         NULL,
    setup           SEQUENCE {
        semiPersistSchedIntervalDL      ENUMERATED {
                                        sf10, sf20, sf32, sf40, sf64, sf80,
                                        sf128, sf160, sf320, sf640, spare6,
                                        spare5, spare4, spare3, spare2,
                                        spare1},
        numberOfConfSPS-Processes       INTEGER (1..8),
        n1PUCCH-AN-PersistentList       N1PUCCH-AN-PersistentList,
        ...,
        [[ twoAntennaPortActivated-r10      CHOICE {
            release                         NULL,
            setup                           SEQUENCE {
                n1PUCCH-AN-PersistentListP1-r10     N1PUCCH-AN-PersistentList
            }
        }                                                       OPTIONAL -- Need ON
        ]]
    }
}
SPS-ConfigUL ::= CHOICE {
    release         NULL,
    setup           SEQUENCE {
        semiPersistSchedIntervalUL      ENUMERATED {
                                        sf10, sf20, sf32, sf40, sf64, sf80,
                                        sf128, sf160, sf320, sf640, spare6,
                                        spare5, spare4, spare3, spare2,
                                        spare1},
        implicitReleaseAfter            ENUMERATED {e2, e3, e4, e8},
        p0-Persistent                   SEQUENCE {
            p0-NominalPUSCH-Persistent          INTEGER (-126..24),
            p0-UE-PUSCH-Persistent              INTEGER (-8..7)
        }                                                       OPTIONAL, -- Need OP
        twoIntervalsConfig              ENUMERATED {true}       OPTIONAL, -- Cond TDD
        ...,
        [[ p0-PersistentSubframeSet2-r12    CHOICE {
```

TABLE 1-continued

```
        release                                      NULL,
        setup                                        SEQUENCE {
            p0-NominalPUSCH-PersistentSubframeSet2-r12   INTEGER (-126..24),
            p0-UE-PUSCH-PersistentSubframeSet-r12        INTEGER (-8..7)
        }
      }                                              OPTIONAL -- Need ON
  ]]
  }
}
N1PUCCH-AN-PersistentList ::=   SEQUENCE (SIZE (1..4)) OF INTEGER (0..2047)
-- ASN1STOP
```

As described above, the SPS-Config IE may include at least one of the SPS C-RNTI (semiPersistSchedC-RNTI), the UL SPS interval (semiPersistSchedIntervalUL), the number of empty transmissions before implicit release (implicitReleaseAfter), whether twoIntervalsConfig is enabled for the UL (twoIntervalsConfig), the DL SPS interval (semiPersistSchedIntervalDL), and the number of configured HARQ processes for SPS (numberOfConfSPS-Processes) if the SPS is enabled for the DL.

UE assistance information is described. This can be referred to Section 5.6.10 of 3GPP TS 36.331 V13.2.0 (2016-06). The purpose of this procedure is to inform E-UTRAN of the UE's power saving preference. Upon configuring the UE to provide power preference indications (PPI), E-UTRAN may consider that the UE does not prefer a configuration primarily optimized for power saving until the UE explicitly indicates otherwise.

Figure 4:
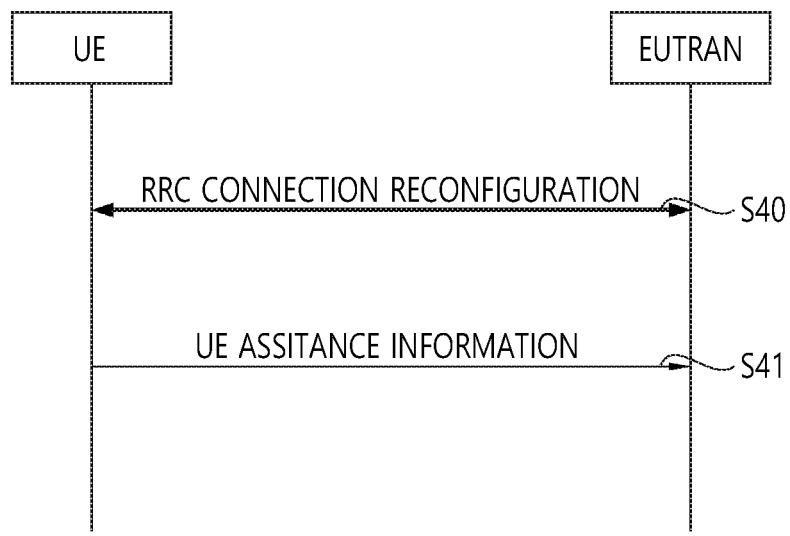
FIG. 4 shows a UE assistance information procedure.

FIG. 4 shows a UE assistance information procedure. In step S40, the UE and the E-UTRAN perform an RRC connection reconfiguration procedure. In step S41, the UE transmits the UE assistance information to the E-UTRAN. A UE capable of providing PPI in RRC_CONNECTED may initiate the procedure in several cases including upon being configured to provide PPI and upon change of power preference.

Upon initiating the procedure, the UE shall:

1> if configured to provide power preference indications:

2> if the UE did not transmit a UEAssistanceInformation message since it was configured to provide power preference indications; or 2> if the current power preference is different from the one indicated in the last transmission of the UEAssistanceInformation message and timer T340 is not running:

3> initiate transmission of the UEAssistanceInformation message. The UE shall set the contents of the UEAssistanceInformation message:

1> if the UE prefers a configuration primarily optimised for power saving:

2> set powerPrefIndication to lowPowerConsumption;

1> else:

2> start or restart timer T340 with the timer value set to the powerPrefIndicationTimer;

2> set powerPrefIndication to normal;

The UE shall submit the UEAssistanceInformation message to lower layers for transmission.

Table 2 shows an example of the UE assistance information.

TABLE 2

```
-- ASN1START
UEAssistanceInformation-r11 ::= SEQUENCE {
    criticalExtensions                  CHOICE {
        c1                              CHOICE {
            ueAssistanceInformation-r11   UEAssistanceInformation-r11-IEs,
            spare3 NULL, spare2 NULL, spare1 NULL
        },
        criticalExtensionsFuture        SEQUENCE { }
    }
}
UEAssistanceInformation-r11-IEs ::= SEQUENCE {
    PowerPrefIndication-r11             ENUMERATED   {normal, lowPowerConsumption}
OPTIONAL,
    lateNonCriticalExtension            OCTET STRING                              OPTIONAL,
    nonCriticalExtension                SEQUENCE { }                              OPTIONAL
}
-- ASN1STOP
```

Vehicle-to-everything (V2X) communication is described. V2X communication contains the three different types, i.e. vehicle-to-vehicle (V2V) communications, vehicle-to-infrastructure (V2I) communications, and vehicle-to-pedestrian (V2P) communications. These three types of V2X can use "co-operative awareness" to provide more intelligent services for end-users. This means that transport entities, such as vehicles, road side unit (RSU), and pedestrians, can collect knowledge of their local environment (e.g. information received from other vehicles or sensor equipment in proximity) to process and share that knowledge in order to provide more intelligent services, such as cooperative collision warning or autonomous driving.

V2X service is a type of communication service that involves a transmitting or receiving UE using V2V application via 3GPP transport. Based on the other party involved in the communication, it can be further divided into V2V service, V2I service, V2P service, and vehicle-to-network (V2N) service. V2V service is a type of V2X service, where both parties of the communication are UEs using V2V application. V2I service is a type of V2X service, where one party is a UE and the other party is an RSU both using V2I application. The RSU is an entity supporting V2I service that can transmit to, and receive from a UE using V2I application. RSU is implemented in an eNB or a stationary UE. V2P service is a type of V2X service, where both parties of the communication are UEs using V2P application. V2N service is a type of V2X service, where one party is a UE and the other party is a serving entity, both using V2N applications and communicating with each other via LTE network entities.

In V2V, E-UTRAN allows such UEs that are in proximity of each other to exchange V2V-related information using E-UTRA(N) when permission, authorization and proximity criteria are fulfilled. The proximity criteria can be configured by the mobile network operator (MNO). However, UEs supporting V2V service can exchange such information when served by or not served by E-UTRAN which supports V2X service. The UE supporting V2V applications transmits application layer information (e.g. about its location, dynamics, and attributes as part of the V2V service). The V2V payload must be flexible in order to accommodate different information contents, and the information can be transmitted periodically according to a configuration provided by the MNO. V2V is predominantly broadcast-based. V2V includes the exchange of V2V-related application information between distinct UEs directly and/or, due to the limited direct communication range of V2V, the exchange of V2V-related application information between distinct UEs via infrastructure supporting V2X Service, e.g. RSU, application server, etc.

In V2I, the UE supporting V2I applications sends application layer information to RSU. RSU sends application layer information to a group of UEs or a UE supporting V2I applications.

In V2P, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P service can exchange such information even when not served by E-UTRAN which supports V2X service. The UE supporting V2P applications transmits application layer information. Such information can be broadcast by a vehicle with UE supporting V2X Service (e.g. warning to pedestrian), and/or by a pedestrian with UE supporting V2X Service (e.g. warning to vehicle). V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X service, e.g. RSU, application server, etc.

In V2X communication, messages such as common awareness messages (CAM), decentralized environmental notification messages (DENM), or basic safety messages (BSM) may be transmitted. The CAM includes information such as the type, position, speed, and direction of the vehicle, and may be periodically broadcast by all vehicles. The DENM includes information such as the type of a specific event, the region where a specific event occurred, etc., and may be broadcast by an RSU or a vehicle. The BSM is included in the US J2735 safety message and has features similar to CAM. The BSM may provide emergency brake warning, front collision warning, intersection safety support, blind spot and lane change warning, overtaking warning, and out of control warning service.

Due to the nature of V2X communication, a method of transmitting V2X messages by using resources allocated through SPS is discussed. That is, a method of transmitting V2X messages to a network or another UE by using UL SPS resources or the SL SPS resources is under discussion. The following items have been proposed to this end.

(1) A plurality of SPS configurations may be activated at the same time.

(2) The UE assistance information for the SPS may be provided to the eNB. The transmission of UE assistance information for the SPS may be triggered based on the UE implementation.

(3) UE assistance information for the SPS may include a period and a timing offset.

(4) The UE may estimate the period and timing offset based on the UE implementation.

(5) Based on the UE transmission completion indication, at least an explicit SPS resource release by the eNB should be supported. Whether another SPS release trigger should be introduced may be discussed later.

(6) Whether the SPS configuration should be connected to the RB may be discussed later.

Based on the above proposal, the present invention proposes detailed features of the SPS configuration and the UE assistance information for the SPS. In the following description, the assistance information for the SPS may be applied to both the UL SPS and the SL SPS.

1. When CAM transmission and DENM transmission are performed in parallel, a plurality of SPS may be used. Thus, for the SL transmissions, maximum two SPS configurations may be configured. For example, a first SPS configuration may be configured for the CAM, and a second SPS configuration may be configured for the DEMN. Different SPS configurations may be required for the CAM and the DENM.

The CAM and DENM may have to be transmitted over separate logical channels with different priorities. Thus, one SPS configuration may be associated with one SL logical channel. Alternatively, when the CAM and DENM are mapped to different SL logical channel groups, one SPS configuration may be associated with one SL logical channel group.

The eNB may configure a plurality of SPS configuration lists for the UE in RRC_CONNECTED via dedicated signaling. For example, the eNB may configure maximum two SPS configuration lists for the UE in RRC_CONNECTED via dedicated signaling.

2. One SPS configuration may include a list of candidate SPS periods and a list of candidate time offsets. The UE may select the SPS period and/or time offset, and may indicate the selected SPS period and/or the time offset in the UE assistance information. Table 3 shows an example of a list of candidate SPS periods.

TABLE 3

| Periodicity | ENUMERATED { sf100, sf200, sf300, sf400, sf500, sf600, sf700, sf800, sf900, sf1000, spare6, spare5, spare4, spare3, spare2, spare1}, |
|---|---|

The RRC may configure one or more candidate SPS periods for each SPS configuration.

With respect to the time offsets, the eNB may control the sensitivity/frequency of UE assistance information reporting. For example, if the time offset interval is 20 ms, 40 ms, 60 ms and 80 ms during 100 ms SPS period, then the UE should report the UE assistance information whenever time deviation exceeds 20 ms. However, if the time offset interval is 50 ms during the 100 ms SPS period, then the UE will report UE assistance information only when the time deviation is greater than 50 ms. Therefore, compared with the first case, in the second case, the number of reports from UE and the number of SPS reactivation will be decreased. If the eNB wants to frequently reactivate the SPS with the 20 ms time offset interval, the eNB may set the time offset interval to 20 ms. On the other hand, if the eNB infrequently reactivates the SPS with the 50 ms time offset interval, the eNB may set the time offset interval to 50 ms.

The candidate SPS time offsets may be configured with time OffsetIndexMax, which is the total number of time offset indices in the SPS period of the RRC ASN.1, as shown in Table 4, so that the eNB can properly control the time offset interval.

TABLE 4

| timeOffsetIndexMax | INTEGER (0..99) |
|---|---|

The actual time offset may be calculated by Equation 1.

actual time offset (ms)=floor (periodicity/(timeOffsetIndexMax+1))*time offset index(time offset index=1,2 . . . timeOffsetIndexMax)    <Equation 1>

By selecting time OffsetIndexMax, the eNB may control the sensitivity/frequency in reporting the UE assistance information. For example, if the operator selects 4 for the timeOffsetIndexMax, the eNB informs the UE that timeOffsetIndexMax is 4 by RRC signaling. Therefore, the UE may consider that the time offset index may be set to one of 1, 2, 3 and 4. It may be considered that while the UE is performing the SPS transmissions at the 100 ms period, the actual time offsets may be 20, 40, 60 and 80 ms. On the other hand, if the timeOffsetIndexMax indicates 1, the actual time offset may be only 50 ms. Therefore, the UE assistance information may only be transmitted when the time deviation becomes 50 ms or more. That is, the eNB may reactivate the SPS only when the time deviation is greater than 50 ms. The number of times of reporting from the UE and the number of times of SPS reactivation may be reduced when the timeOffsetIndexMax indicates 1 as compared to when the timeOffsetIndexMax indicates 4.

Thus, upon detecting that a change in the SPS period is needed, the MAC layer of the UE may select a new SPS period from the list of candidate SPS periods and indicate the order of the SPS period selected from the list of candidate SPS periods. Upon detecting that the change in the SPS time offset is required, the MAC layer of the UE may select the new SPS time offset from the list of candidate SPS time offsets, and indicate the time offset index corresponding to the selected SPS time offset.

3. The UE assistance information for the SPS may be used by the UE to assist the eNB adjust/release the SPS resource allocation when the message generation time deviates from the configured resource allocation. How the current UE assistance information is delivered via the Uu interface has not been determined. However, since the SPS resource allocation and transmission is performed in the MAC layer, the report on the UE assistance information may be specified in the MAC layer. That is, it may be proposed to use a MAC control element (CE) for the report on the UE assistance information. It has also been agreed that a new MAC CE will be introduced for SPS validation. Thus, a new MAC CE for the report on the UE assistance information, which is used for both V2V SL SPS and V2X UL SPS, may be introduced.

The new MAC CE for the report on the UE assistance information may be a SPS assistance MAC CE.

In addition, a new logical channel ID (LCID) needs to be allocated for the SPS assistance MAC CE. Table 5 shows an example of the LCID value for the UL-SCH, including the new LCID allocated for the SPS assistance MAC.

TABLE 5

| Index | LCID values |
|---|---|
| 00000 | CCCH |
| 00001-01010 | Identity of the logical channel |
| 01011 | CCCH |
| 01100-10100 | Reserved |
| 10100 | SPS assistance |
| 10101 | SPS confirmation |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

Referring to Table 5, the LCID having a value of 10100 is allocated to the SPS assistance MAC CE.

Figure 5:
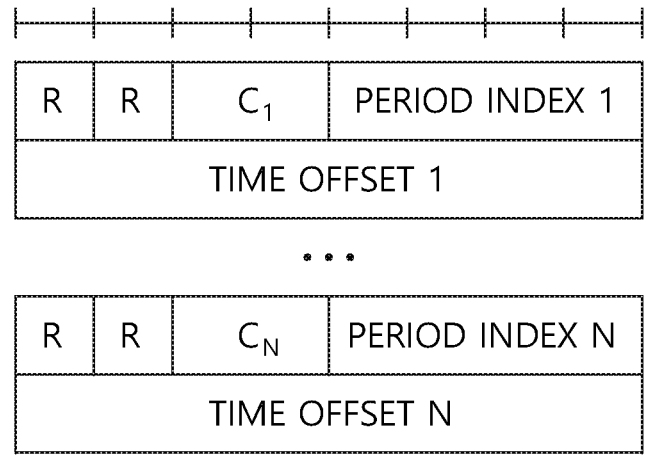
FIG. 5 shows a format of a SPS assistance MAC CE according to an embodiment of the present invention.

FIG. 5 shows a format of a SPS assistance MAC CE according to an embodiment of the present invention. The size of SPS assistance MAC CE may be changed. The fields shown in FIG. may can be defined as follows.

R: Reserved bit, set to "0".

Ci: This field identifies the SPS configuration when the SPS configuration list is configured. This value is set to an index for one configuration in the SPS configuration list.

Periodic index: This field indicates the index of the period selected in the SPS configuration corresponding to the C field.

Time Offset Index: This field indicates the index of the time offset selected in the SPS configuration corresponding to the C field.

SPS assistance MAC CE may support up to 4 SPS configurations. Considering the combination of CAM, DENM and VoIP in parallel, a plurality of SPS configurations included in the SPS assistance MAC CE may be activated at the same time.

4. Meanwhile, it has been agreed that the report on the UE assistance information for the SPS as described above will be triggered based on the UE implementation. However, it is desirable to avoid the case when the UE repeats transmission of the same UE assistance information for the SPS. For example, the UE may request the eNB for a specific period and/or a specific time offset. However, the eNB may not accept it. That is, the UE should not continuously trigger transmitting the same UE assistance information for the SPS.

To avoid repeated transmission of the same UE assistance information for the SPS, the report on the UE assistance information for the SPS may be triggered only when the information to be reported changes. That is, the report on the assistance information for the SPS may be triggered only when the SPS period and/or time offset is changed. Thus, only the UE assistance information for the latest SPS may always be transmitted. When the UE assistance information for the SPS is transmitted, the report on the UE assistance information for all triggered SPS may be canceled.

Nevertheless, whenever the cell changes (i.e. handover), the UE may need to transmit the UE assistance information for the SPS. This is because the target eNB may not know which period/time offset needs to be currently set. However, delays may occur because the UE has to transmit the UE assistance information for the SPS whenever the cell changes.

Instead, the source eNB in the handover procedure may forward the UE assistance information for the SPS received from the UE to the target eNB in the handover procedure. The source eNB may thus help the target eNB to properly activate the SPS. The UE assistance information for the SPS that the source eNB forwards to the target eNB may include the current SPS period. In addition, the UE assistance information for the SPS that the source eNB forwards to the target eNB may include an actual time offset. The actual time offset may be set by considering the time offset included in the UE assistance information for the SPS reported from the UE. In addition, the actual time offset may be set by considering the time offset included in the UE assistance information for the SPS reported from the UE and the time difference between the source eNB and the target eNB. The source eNB may forward the UE assistance information for the SPS to the target eNB via an X2 interface. Alternatively, the source eNB may forward UE assistance information for the SPS to the target eNB via an inter-node RRC message.

Figure 6:
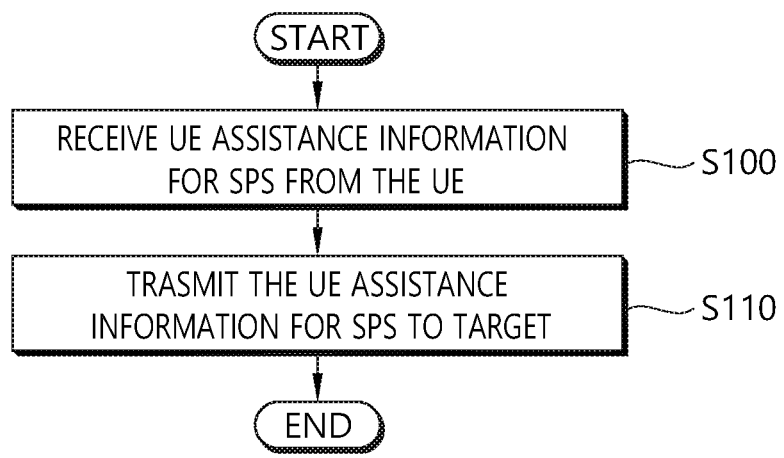
FIG. 6 shows a method for transmitting UE assistance information for SPS by a source eNB to a target eNB according to an embodiment of the present invention.

FIG. 6 shows a method for transmitting UE assistance information for SPS by a source eNB to a target eNB according to an embodiment of the present invention.

In step S100, the source eNB receives the UE assistance information for the SPS from the UE. Hereinafter, the UE assistance information for the SPS is referred to as SPS assistance information. The SPS assistance information may be included in the UE assistance information described in FIG. 4. A UE capable of providing SPS assistance information in RRC_CONNECTED may initiate the UE assistance information procedure in several cases including upon being configured to provide SPS assistance information and upon change of SPS assistance information.

Upon initiating the UE assistance information procedure, the UE shall:

1> if configured to provide SPS assistance information:

2> if the UE did not transmit a UEAssistanceInformation message with sps-AssistanceInformation since it was configured to provide SPS assistance information; or 2> if the current SPS assistance information is different from the one indicated in the last transmission of the UEAssistanceInformation message:

3> initiate transmission of the UEAssistanceInformation message.

If configured to provide SPS assistance information, the UE shall set the contents of the UEAssistanceInformation message for SPS assistance information:

1> if configured to provide SPS assistance information:

2> if there is any traffic for V2X SL communication which needs to report SPS assistance information:

3> include trafficPatternInfoListSL in the UEAssistanceInformation message;

2> if there is any traffic for UL communication which needs to report SPS assistance information:

3> include trafficPatternInfoListUL in the UEAssistanceInformation message;

It is up to UE implementation when and how to trigger SPS assistance information.

Table 6 shows an example of UE assistance information including the SPS assistance information according to an embodiment of the present invention.

TABLE 6

```
-- ASN1START
UEAssistanceInformation-r11 ::= SEQUENCE {
    criticalExtensions                  CHOICE {
        c1                                  CHOICE {
            ueAssistanceInformation-r11         UEAssistanceInformation-r11-IEs,
            spare3 NULL, spare2 NULL, spare1 NULL
        },
        criticalExtensionsFuture        SEQUENCE { }
    }
}
UEAssistanceInformation-r11-IEs ::= SEQUENCE {
    PowerPrefIndication-r11                 ENUMERATED {normal, lowPowerConsumption}
OPTIONAL,
    lateNonCriticalExtension            OCTET STRING                    OPTIONAL,
    nonCriticalExtension                SEQUENCE { }                    OPTIONAL
}
UEAssistanceInformation-v1430-IEs ::= SEQUENCE {
    bw-Preference-r14                       BW-Preference-r14               OPTIONAL,
    sps-AssistanceInformation-r14       SEQUENCE {
        trafficPatternInfoListSL-r14            TrafficPatternInfoList-r14      OPTIONAL,
        trafficPatternInfoListUL-r14            TrafficPatternInfoList-r14      OPTIONAL
    }                                                                       OPTIONAL,
    rlm-Report-r14                      SEQUENCE {
        rlm-Event-r14                       ENUMERATED {earlyOutOfSync, earlyInSync},
        excessRep-MPDCCH-r14                ENUMERATED {excessRep1, excessRep2}  OPTIONAL
    }                                                                       OPTIONAL,
    delayBudgetReport-r14                   DelayBudgetReport-r14           OPTIONAL,
    nonCriticalExtension                SEQUENCE { }                    OPTIONAL
}
TrafficPatternInfoList-r14      ::=  SEQUENCE  (SIZE  (1..maxTrafficPattern-r14))  OF
TrafficPatternInfo-r14
TrafficPatternInfo-r14 ::= SEQUENCE {
    trafficPeriodicity-r14      ENUMERATED {
                                    sf20, sf50, sf100, sf200, sf300, sf400, sf500,
                                    sf600, sf700, sf800, sf900, sf1000},
```

TABLE 6-continued

```
timingOffset-r14           INTEGER (0..10239),
priorityInfoSL-r14         SL-Priority-r13              OPTIONAL,
logicalChannelIdentityUL-r14   INTEGER (3..10)          OPTIONAL,
messageSize-r14            BIT STRING (SIZE (6))
}
-- ASN1STOP
```

Referring to Table 6, the UE assistance information message may further include a sps-AssistanceInformation information element (IE), which is the SPS assistance information, compared with Table 2. That is, the sps-AssistanceInformation IE indicates the UE assistance information to assist that the network configures the SPS.

The SPS assistance information may include the trafficPatternInfoListSL IE, which is the SPS assistance information for the SL. The trafficPatternInfoListSL IE provides the traffic characteristics of the SL logical channels that are configured for the V2X SL communications. The trafficPatternInfoListSL IE may include the trafficPeriodicity field and the timingOffset field. The trafficPeriodicity field indicates the data arrival period estimated in the SL logical channel. The timingOffset field indicates the timing estimated for packet arrival in the UL logical channel. This value represents the timing offset for subframe #0 and SFN #0.

Referring back to FIG. 6, in step S110, the source eNB transmits the UE assistance information for the SPS to the target eNB. The UE assistance information for the SPS may be transmitted in the following manner.

The UE assistance information message including the SPS assistance information may be included in the AS-Context IE as shown in Table 7. The AS-Context IE is used to convey a local E-UTRAN context required by the target eNB.

TABLE 7

```
-- ASN1START
AS-Context ::= SEQUENCE {
    reestablishmentInfo     ReestablishmentInfo     OPTIONAL    -- Cond HO
}
AS-Context-v1130 ::= SEQUENCE {
    idc-Indication-r11         OCTET STRING (CONTAINING
                                    InDeviceCoexIndication-r11)    OPTIONAL, -- Cond HO2
    mbmsInterestIndication-r11    OCTET STRING (CONTAINING
                                    MBMSInterestIndication-r11)    OPTIONAL, -- Cond HO2
    powerPrefIndication-r11       OCTET STRING (CONTAINING
                                    UEAssistanceInformation-r11)   OPTIONAL, -- Cond HO2
    ...,
    [[ sidelinkUEInformation-r12    OCTET STRING (CONTAINING
                                    SidelinkUEInformation-r12)     OPTIONAL -- Cond HO2
    ]]
}
AS-Context-v1320 ::= SEQUENCE {
    wlanConnectionStatusReport-r13    OCTET STRING (CONTAINING
                                    WLANConnectionStatusReport-r13)    OPTIONAL -- Cond HO2
}
-- ASN1STOP
``` mated for the packet arrival in the SL logical channel. This value represents the timing offset for subframe #0 and SFN #0.

In addition, the SPS assistance information may include the trafficPatternInfoListUL IE, which is the SPS assistance information for the UL. The trafficPatternInfoListUL IE provides the traffic characteristics of the UL logical channel. The trafficPatternInfoListUL IE may include the trafficPeriodicity field and the timingOffset field. The trafficPeriodicity field indicates the data arrival period estimated in the UL logical channel. The timingOffset field indicates the Referring to Table 7, the AS-Context IE includes UE assistance information message UEAssistanceInformation. The UEAssistanceInformation includes the SPS assistance information.

The AS-Context IE described above may be included in HandoverPreparationInformation, which is a handover preparation information message as shown in Table 8. This message includes UE capability information and is used to transmit the E-UTRA RRC information used by the target eNB during handover preparation. This message is sent from the source eNB to the target eNB.

TABLE 8

```
-- ASN1START
HandoverPreparationInformation ::= SEQUENCE {
    criticalExtensions          CHOICE {
        c1                          CHOICE{
            handoverPreparationInformation-r8    HandoverPreparationInformation-r8-IEs,
            spare7 NULL,
            spare6 NULL, spare5 NULL, spare4 NULL,
            spare3 NULL, spare2 NULL, spare1 NULL
        },
```

TABLE 8-continued

```
    criticalExtensionsFuture    SEQUENCE { }
    }
}
...
HandoverPreparationInformation-v1130-IEs ::= SEQUENCE {
    as-Context-v1130         AS-Context-v1130                    OPTIONAL, -- Cond HO2
    nonCriticalExtension     HandoverPreparationInformation-v1250-IEs    OPTIONAL
}
...
-- ASN1STOP
```

Referring to Table 8, the handover preparation information message includes the AS-Context IE. Thus, SPS assistance information may be sent from the source eNB to the target eNB.

5. As described above, based on the transmission completion indication from the UE, at least an explicit SPS resource release by the eNB should be supported, and it has been agreed whether another SPS release trigger should be introduced later. In the SL, the SPS transmission completion indication of the UE may be supported by one of the following solutions.

Solution 1: when the SPS transmission in the SL is completed for a specific logical channel (e.g. DENM), a scheduling request and SL buffer status report (BSR) may be triggered. The SL BSR MAC CE may indicate a buffer size of 0 bytes for the corresponding LCG in order to request the SPS release to the eNB.

Solution 2: Upon completion of the SPS transmission on the SL for a specific logical channel (e.g. DENM), the scheduling request and the SPS assistance MAC CE may be triggered to request the SPS release to the eNB.

For both solutions, the eNB ultimately decides whether to release the SPS. The solution 1 may have an effect on the existing SL BSR procedure, so the solution 2 may be preferred. The new field indicating the SPS release request may be introduced within the SPS assistance MAC CE. Alternatively, rather than introducing the new field indicating an SPS release request, a specific value (e.g., 1111) in the periodic index field may indicate the SPS release request for that SPS configuration.

In addition, the new SL SPS C-RNTI may be introduced to support the SL SPS. The SL SPS C-RNTI may be configured per SPS configuration, or may be configured per UE. The new SL SPS C-RNTI may (re)activate or deactivate the SL SPS.

Figure 7:
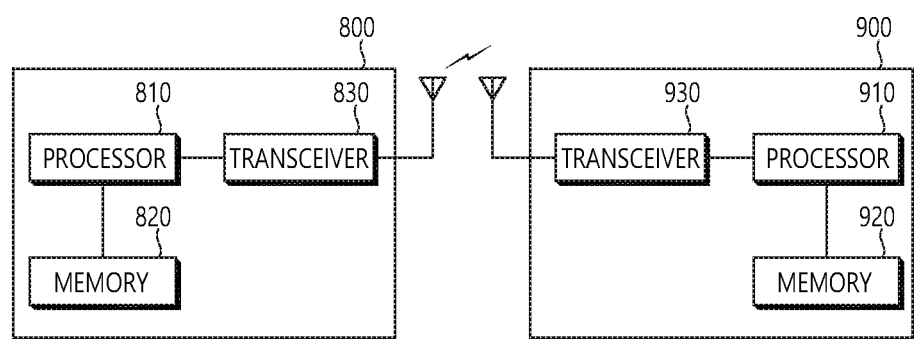
FIG. 7 shows a wireless communication system to implement an embodiment of the present invention.

FIG. 7 shows a wireless communication system to implement an embodiment of the present invention.

A source eNB 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE or a target eNB 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to the present invention, a target eNB can effectively allocate SPS resources to UEs after handover is performed, and accordingly, the UE can efficiently transmit vehicle-to-everything (V2X) messages through the allocated SPS resources.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a source base station in a wireless communication system, the method comprising:
   receiving, from a wireless device, user equipment (UE) assistance information for semi-persistent scheduling (SPS), the UE assistance information comprising a time offset of a packet for a transmission by the wireless device;
   determining an adjusted time offset of a packet for a transmission by the wireless device based on the time offset reported by the wireless device and a timing difference between the source base station and a target base station; and
   transmitting a message comprising the adjusted time offset to the target base station in a handover procedure, wherein the UE assistance information for SPS is received from the wireless device upon a change of the time offset.

2. The method of claim 1, wherein the UE assistance information for SPS includes at least one of UE assistance information for a sidelink (SL) SPS or UE assistance information for an uplink (UL) SPS.

3. The method of claim 1, wherein the UE assistance information for SPS is transmitted from the source base station to the target base station via an X2 interface.

4. The method of claim 1, wherein the UE assistance information for SPS is included in an AS-context information element (IE).

5. The method of claim 1, further comprising:
transmitting, to the wireless device, a first SPS configuration for a first logical channel comprising information for SPS resources for a transmission of a packet related to the first logical channel, and a second SPS configuration for a second logical channel comprising information for SPS resources for a transmission of a packet related to the second logical channel;
receiving, from the wireless device, SPS assistance information for requesting a release of the first SPS configuration for the first logical channel upon an end of an SPS transmission of the packet related to the first logical channel; and
releasing the first SPS configuration for the first logical channel based on the SPS assistance information.

6. The method of claim 5,
wherein the SPS assistance information comprises an index of the first SPS configuration to be released, and
wherein a period index field for identifying a time period of the SPS transmission in the SPS assistance information informs a request for a release of the first SPS configuration.

7. A base station in a wireless communication system, the base station comprising:
a memory;
a transceiver; and
at least one processor operatively coupled to the memory and the transceiver, wherein the at least one processor is configured to:
control the transceiver to receive, from a wireless device, user equipment (UE) assistance information for a semi-persistent scheduling (SPS), the UE assistance information comprising a time offset of a packet for a transmission by the wireless device,
determine an adjusted time offset of a packet for a transmission by the wireless device based on the time offset reported by the wireless device and a timing difference between the base station and a target base station for a handover, and
control the transceiver to transmit, to the target base station, a message comprising the adjusted time offset in a handover procedure,
wherein the UE assistance information for SPS is received from the wireless device upon a change of the time offset.

8. The base station of claim 7, wherein the UE assistance information for SPS includes at least one of UE assistance information for a sidelink (SL) SPS or UE assistance information for an uplink (UL) SPS.

9. The base station of claim 7, wherein the UE assistance information for SPS is transmitted from the source base station to the target base station via an X2 interface.

10. The base station of claim 7, wherein the UE assistance information for SPS is included in an AS-context information element (IE).

11. The base station of claim 7, wherein the at least one processor is further configured to:
control the transceiver to transmit, to the wireless device, a first SPS configuration for a first logical channel comprising information for SPS resources for a transmission of a packet related to the first logical channel, and a second SPS configuration for a second logical channel comprising information for SPS resources for a transmission of a packet related to the second logical channel,
control the transceiver to receive, from the wireless device, SPS assistance information for requesting a release of the first SPS configuration for the first logical channel upon an end of an SPS transmission of the packet related to the first logical channel, and
release the first SPS configuration for the first logical channel based on the SPS assistance information.

12. The base station of claim 11,
wherein the SPS assistance information comprises an index of the first SPS configuration to be released, and
wherein a period index field for identifying a time period of the SPS transmission in the SPS assistance information informs a request for a release of the first SPS configuration.

* * * * *